US012795665B2

(12) United States Patent
Awadin et al.

(10) Patent No.: US 12,795,665 B2
(45) Date of Patent: Nov. 10, 2026

(54) MULTI-PHYSICAL UPLINK CONTROL CHANNEL FOR MULTI-PHYSICAL DOWNLINK SHARED CHANNEL SCHEDULING

(71) Applicant: Samsung Electronics Co., Ltd., Gyeonggi-do (KR)

(72) Inventors: Mohamed Mokhtar Gaber Moursi Awadin, San Diego, CA (US); Hamid Saber, San Diego, CA (US); Yuan-Sheng Cheng, San Diego, CA (US); Jung Hyun Bae, San Diego, CA (US); Mohammed Karmoose, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 488 days.

(21) Appl. No.: 18/352,614

(22) Filed: Jul. 14, 2023

(65) Prior Publication Data

US 2024/0057082 A1 Feb. 15, 2024

Related U.S. Application Data

(60) Provisional application No. 63/407,906, filed on Sep. 19, 2022, provisional application No. 63/397,662, filed on Aug. 12, 2022.

(51) Int. Cl.

| | |
|---|---|
| ***H04W 72/20*** | (2023.01) |
| ***H04L 1/1812*** | (2023.01) |
| ***H04W 72/1273*** | (2023.01) |

(52) U.S. Cl.

CPC ....... *H04W 72/1273* (2013.01); *H04L 1/1812* (2013.01); *H04W 72/20* (2023.01)

(58) Field of Classification Search

CPC . H04W 72/1273; H04W 72/20; H04W 72/23; H04W 72/21; H04L 1/1812; H04L 1/1861; H04L 1/189

See application file for complete search history.

(56) References Cited

U.S. PATENT DOCUMENTS

| | | | |
|---|---|---|---|
| 11,405,903 B2 | 8/2022 | Choi et al. | |
| 2020/0127796 A1* | 4/2020 | Li | H04L 1/1812 |

(Continued)

FOREIGN PATENT DOCUMENTS

| | | |
|---|---|---|
| WO | WO 2021/186400 | 9/2021 |
| WO | WO 2022/204856 | 10/2022 |
| WO | WO 2023/010467 | 2/2023 |

*Primary Examiner* — Moo Jeong
*Assistant Examiner* — David Zhijun Sun
(74) *Attorney, Agent, or Firm* — The Farrell Law Firm, P.C.

(57) ABSTRACT

A system and a method are disclosed for using a single DCI to schedule multi-PDSCHs to have multiple PUCCH occasions for sending HARQ feedback for the PDSCHs. A method includes receiving, from a base station, a DCI for multiple PDSCHs, the DCI including an indication of at least one PRI and at least one timing indicator (K1) for providing multiple PUCCHs to carry HARQ feedback for the PDSCHs; receiving the PDSCHs from the base station; determining a PRI value and a K1 value for each of the multiple PUCCHs, based on the indication of the at least one PRI and the at least one K1; and transmitting, to the base station, at least one PUCCH among the multiple PUCCHs including the HARQ feedback for the PDSCHs, based on the determined PRI and K1 values.

19 Claims, 15 Drawing Sheets

(56) References Cited

U.S. PATENT DOCUMENTS

| | | | | |
|---|---|---|---|---|
| 2021/0266946 | A1 | 8/2021 | Li et al. | |
| 2021/0314093 | A1 | 10/2021 | Mu | |
| 2022/0046696 | A1* | 2/2022 | Park | H04L 27/2607 |
| 2022/0224455 | A1 | 7/2022 | Falahati et al. | |
| 2022/0311545 | A1* | 9/2022 | Sun | H04L 1/1812 |
| 2023/0083414 | A1* | 3/2023 | Takeda | H04L 1/1861<br>370/329 |
| 2023/0371027 | A1* | 11/2023 | Fu | H04W 72/20 |
| 2024/0040587 | A1* | 2/2024 | Rastegardoost | H04W 72/232 |
| 2024/0057095 | A1* | 2/2024 | Sakhnini | H04L 5/0055 |

* cited by examiner

1400

MULTI-PHYSICAL UPLINK CONTROL CHANNEL FOR MULTI-PHYSICAL DOWNLINK SHARED CHANNEL SCHEDULING

CROSS-REFERENCE TO RELATED APPLICATION

This application claims the priority benefit under 35 U.S.C. § 119(e) of U.S. Provisional Application Nos. 63/397,662 and 63/407,906, which were filed on Aug. 12, 2022, and Sep. 19, 2022, respectively, the disclosure of each of which is incorporated by reference in its entirety as if fully set forth herein.

TECHNICAL FIELD

The disclosure generally relates to reducing scheduling latency for latency-critical and high reliability applications, such as extended reality (XR) applications. More particularly, the subject matter disclosed herein relates to improvements in which a single downlink (DL) control information (DCI) may schedule multi-physical DL shared channel (PDSCHs) to have multiple physical uplink (UL) control channel (PUCCH) occasions that are used for sending hybrid automatic repeat request (HARQ) feedback for the PDSCHs.

SUMMARY

In the 3$^{rd}$ Generation Partnership Project (3GPP) standard for new radio (NR), a user equipment (UE) is designed to receive different DL signals from a base station (e.g., a gNodeB (gNB)). In NR, a UE receives DL transmission to retrieve a variety of information from the gNB. In particular, the UE receives user data from the gNB in a particular configuration of time and frequency resources known as the PDSCH. Specifically, a medium access control (MAC) layer provides user data that is intended to be delivered to a corresponding layer at the UE side. A physical (PHY) layer of the UE takes the physical signal received on the PDSCH as an input to the PDSCH processing chain, the output of which is fed as an input to the MAC layer.

Similarly, the UE receives control data from the gNB in a physical DL control channel (PDCCH). The control data may be referred to as DCI and is converted into the PDCCH signal through a PDCCH processing chain on the gNB side.

Conversely, the UE sends UL signals to convey user data or control information, respectively referred to as a physical UL shared channel (PUSCH) or a physical UL control channel (PUCCH). The PUSCH is used by the UE MAC layer to deliver data to the gNB, and the PUCCH is used to convey control data, which may be referred to as UL control information (UCI), and which is converted to the PUCCH signal through a PUCCH processing chain at the UE side.

The UE can be scheduled for a PUSCH transmission (possibly with repetition) by a dynamic grant (DG), a configured grant type 1 (CG1), or a configured grant type 2 (CG2).

There are two repetition mechanisms for PUSCH transmission in 3GGP Rel-16. In Type A repetition, the UE is scheduled with a set of K repetitions, and the UE attempts to transmit K PUSCH transmissions in K consecutive slots. If one of the K slots is not available for UL transmission, the transmission is dropped.

In Type B repetition, the UE is scheduled with a set of K nominal repetitions. The UE determines a set of actual PUSCH transmission occasions, which are not necessarily in different slots. If one of the K slots is not available for UL transmission, the transmission is dropped.

The UE can also be scheduled for a PDSCH transmission (possibly with repetition) by a DG or a semi-persistent scheduling (SPS) PDSCH.

3GPP Rel-16 allows for scheduling of a PDSCH with Type-A repetitions. Namely, in Type A repetition, the UE is scheduled with a set of K repetitions, and the UE can attempt to receive K PDSCH transmissions in K consecutive slots. If one of the K slots is not available for DL transmission, the transmission is dropped.

For a PDSCH channel, Rel-16 NR allows for the use of code blocks (CBs) and code block groups (CBGs). The use of CBs may help reduce processing complexity of the PDSCH, and the use of CBGs may help to reduce HARQ feedback overhead by grouping the CBs of a transport block (TB) into a maximum number N of CBGs per TB. The value of N may be configured per cell.

Specifically, procedures for transmitting and receiving a PDSCH signal on an active cell include the following:

On a transmitter (i.e., a gNB) side:

1. The gNB makes a decision to schedule a PDSCH transmission to a UE. The transmission occurs over a particular allocation of resources and with a particular PDSCH configuration. Based on the PDSCH allocation, the gNB determines a TB size (TBS).
2. An amount of data equal to the determined TBS is then allocated as a TB to be transmitted in the PDSCH. The TB is appended with a cyclic redundancy check (CRC).
3. The gNB then divides the TB+CRC into smaller chunks of data, i.e., CBs, where the size of each CB is based on a low density parity check (LDPC) code that is used. The collection of CBs is virtually grouped into a number N of non-overlapping sets of CBs, called CBGs.
4. Each CB is appended with an additional CRC, and the combination of the CB+CRC is coded using the determined LDPC code.
5. The coded outputs of all CBs are rate-matched on the available resources for the PDSCH transmission.

On a receiver (i.e., a UE) side:

1. The UE extracts the received coded output for the CB s included in the PDSCH.
2. The UE then attempts to decode each CB individually.
3. For each CBG, if any CB inside the CBG fails its respective CRC check, then a HARQ negative acknowledgement (NACK) is prepared for a feedback transmission by the UE. Otherwise, a HARQ acknowledgement (ACK) is prepared.
4. The UE then conveys the set of HARQ ACK/NACK bits in UCI transmitted in a PUCCH signal corresponding to the PDSCH.

In 3GPP Rel-16, the UE is configured with a maximum number of CBGs per TB $$N_{HARQ\text{-}ACK}^{CBG/TB,max}$$

per cell, where this information is radio resource control (RRC) configured. For a given TB, the set of C CBs are then grouped into M CBGs, where M is less than or equal to the maximum number of CBGs per TB per cell.

With respect to the transmission of a PUCCH including the HARQ feedback, the UE is provided with a timing value, e.g., K1, which indicates a value k (in terms of slots), such that the PDCCH transmission happens in slot n+k, where n is a slot in which the PDSCH reception ends. The value of k can be RRC configured or dynamically provided by scheduling DCI through a PDSCH-to-HARQ feedback timing indicator field. For example, the PDSCH-to-HARQ feedback timing indicator can be any value from the set {1,2,3,4,5,6,7,8}. Alternatively, the value of the field can map to a set of eight values that are RRC-configured.

For a given slot in which a PUCCH is scheduled by the UE, multiple candidate slots for PDSCH receptions can have corresponding HARQ feedback transmissions in the given slot. The candidate slots may be referred to as monitoring occasions (MOs).

When preparing the UCI to be conveyed in the PUCCH, the UE accounts for all HARQ information bits corresponding to these MOs, taking into account the number of active cells in each MO. The UE prepares the HARQ feedback in a HARQ codebook, which is then mapped onto the UCI. In 3GPP Rel-16, there are two mechanisms for determining the HARQ codebook Type I HARQ codebook (semi-static): the UE assigns HARQ feedback bits for all possible MOs and active cells, irrespective of the actually transmitted PDSCH instances.

Type II HARQ codebook (dynamic): the UE assigns HARQ feedback bits for the MOs and active cells in which a PDSCH is actually transmitted.

FIG. 1 illustrates an example of a DL grant.

Referring to FIG. 1, in legacy NR, a gNB can indicate, to a UE, a PUCCH resource and its time domain location to carry HARQ feedback, e.g., HARQ ACK/NACK. More specifically, a PDCCH 101 indicates the DL grant. Moreover, the PDCCH 101 provides K1 (i.e., a PDSCH-to-HARQ feedback timing indicator of a delay between an end of a slot used to transfer the PDSCH and a start of a slot used to return the HARQ feedback) and a PUCCH resource indicator (PRI) for identifying a PUCCH for carrying the HARQ feedback.

However, in latency-critical and high reliability applications like XR, it may be beneficial to schedule multiple PDSCHs (e.g., carrying different TB s) using a single scheduling DCI. In this type of operation based on R17 beyond 52.6 GHz feature, the HARQ feedback associated with all scheduled PDSCHs are all mapped to the same PUCCH resources indicated via the scheduling DCI.

FIG. 2 illustrates another example of a DL grant.

Referring to FIG. 2, a PDCCH 201 indicates the DL grant. More specifically, the PDCCH 201 provides K1 (i.e., a PDSCH-to-HARQ interval) and a PUCCH resource indicator (PRI) for identifying a PUCCH for carrying the HARQ feedback. As illustrated in FIG. 2, in legacy NR, even if a PDSCH is repeated, e.g., 3 times, or different TB s are scheduled in different PDSCHs, a single PUCCH is indicated relative to a last PDSCH, i.e., K1 after the last PDSCH. That is, the HARQ feedback associated with all 3 scheduled PDSCHs are all mapped to the same PUCCH resources indicated via the scheduling DCI.

Considering latency-critical applications like XR, however, it is also important to ensure that latency in transmitting HARQ feedback of a packet is low. However, using the aforementioned operations in FIG. 2, especially, in frequency range beyond 52.6 GHz in NR, the scheduled PUCCH resource would have to be applicable for sending the HARQ feedback of the all scheduled PDSCHs, which may result in high latency associated with the earlier scheduled PDSCHs.

To overcome these types of issues, systems and methods are described herein in which a single DCI schedules multi-PDSCHs to have multiple PUCCH occasions that are used for sending HARQ feedback of the PDSCHs, such that all PDSCHs are not forced to use the same PUCCH occasion.

The above approaches improve on previous methods because they allow a UE to transmit HARQ feedback as early as possible, rather than waiting until a last PDSCH, when a single DCI schedules multiple PDSCHs.

In an embodiment, a method of a terminal comprises receiving, from a base station, a DCI for multiple PDSCHs, the DCI including an indication of at least one PRI and at least one timing indicator (K1) for providing multiple PUCCHs to carry HARQ feedback for the PDSCHs; receiving the PDSCHs from the base station; determining a PRI value and a K1 value for each of the multiple PUCCHs, based on the indication of the at least one PRI and the at least one K1; and transmitting, to the base station, at least one PUCCH among the multiple PUCCHs including the HARQ feedback for the PDSCHs, based on the determined PRI and K1 values.

In an embodiment, a method of a base station comprises configuring a DCI for multiple PDSCHs, the DCI including an indication of at least one PRI and at least one timing indicator (K1) for providing multiple PUCCHs to carry HARQ feedback for the PDSCHs; transmitting the DCI to a terminal; transmitting the PDSCHs to the terminal; and receiving, from the terminal, at least one PUCCH among the multiple PUCCHs including the HARQ feedback for the PDSCHs, based on determined PRI and K1 values. The terminal determines a PRI value and a K1 value for each of the multiple PUCCHs, based on the indication of the at least one PRI and the at least one K1.

In an embodiment, a terminal comprises a transceiver; and a processor configured to receive, from a base station, a DCI for multiple PDSCHs, the DCI including an indication of at least one PRI and at least one timing indicator (K1) for providing multiple PUCCHs to carry HARQ feedback for the PDSCHs, receive the PDSCHs from the base station, determine a PRI value and a K1 value for each of the multiple PUCCHs, based on the indication of the at least one PRI and the at least one K1, and transmit, to the base station, at least one PUCCH among the multiple PUCCHs including the HARQ feedback for the PDSCHs, based on the determined PRI and K1 values.

In an embodiment, a base station comprises a transceiver; and a processor configured to configure a DCI for multiple PDSCHs, the DCI including an indication of at least one PRI and at least one timing indicator (K1) for providing multiple PUCCHs to carry HARQ feedback for the PDSCHs, transmit the DCI to a terminal, transmit the PDSCHs to the terminal, and receive, from the terminal, at least one PUCCH among the multiple PUCCHs including the HARQ feedback for the PDSCHs, based on determined PRI and K1 values. The terminal determines a PRI value and a K1 value for each of the multiple PUCCHs, based on the indication of the at least one PRI and the at least one K1.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
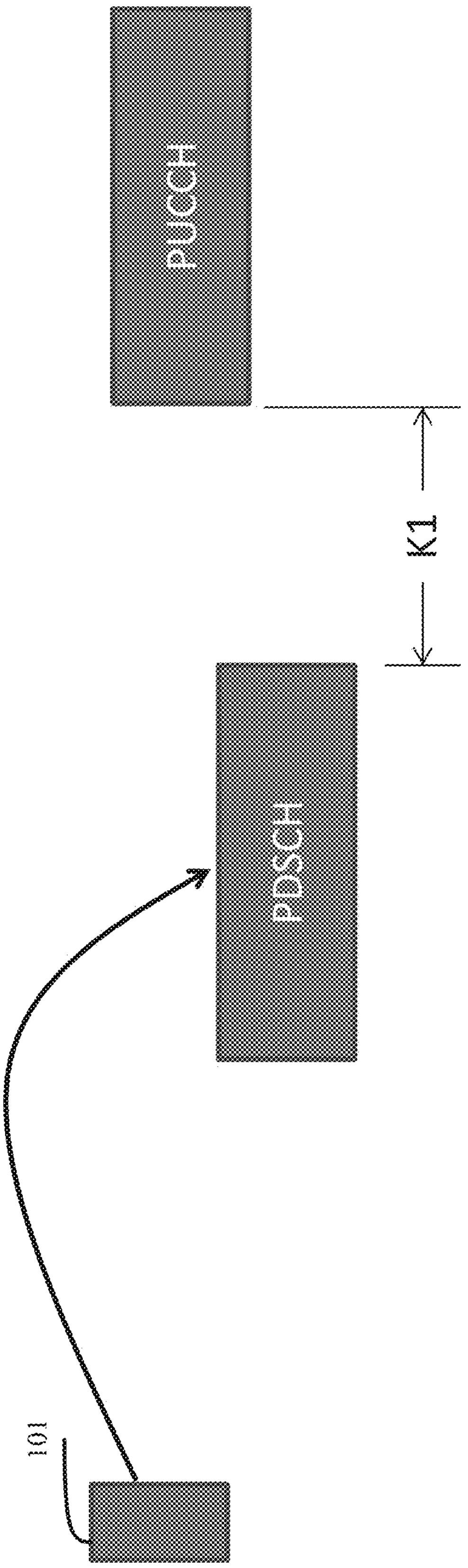
FIG. 1 illustrates an example of a conventional DL grant.
Figure 2:
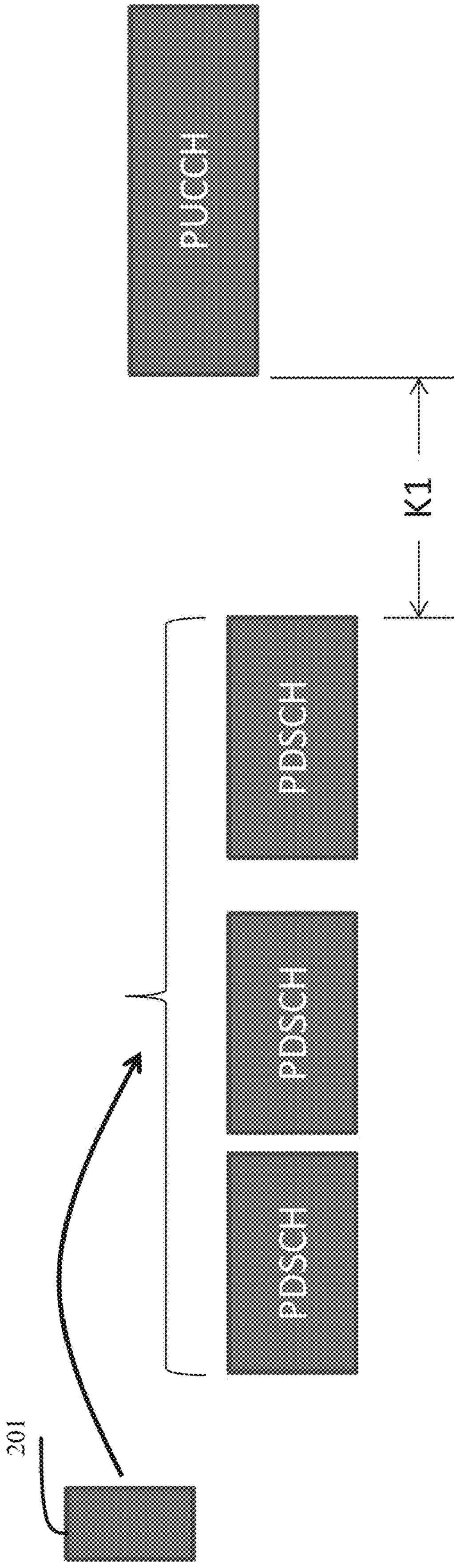
FIG. 2 illustrates another example of a conventional DL grant.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In accordance with an embodiment of the disclosure, a single DCI that schedules multiple PDSCHs with different TBs may be used to schedule multiple PUCCH occasions for sending HARQ feedback of the scheduled PDSCHs. For example, it is assumed that a single DCI schedules K PDSCHs and M PUCCHs. In the following description, with reference to the use of one or multiple K1 values, a value of K1 is used to determine a slot for a PUCCH transmission from a PDSCH in a similar manner as it is used in legacy operation, i.e., if PDSCH reception is in slot n then the indicated value corresponds to slot n+K1.

PUCCH Aspects

Indication of M PUCCH Occasions

As described above, in legacy NR, a PDCCH can carry a single field for indicating a PRI and another field for indicating its time domain location (K1). However, in accordance with an embodiment of the disclosure, a PDCCH may be enhanced to carry multiple PRI and K1 fields.

Figure 3:
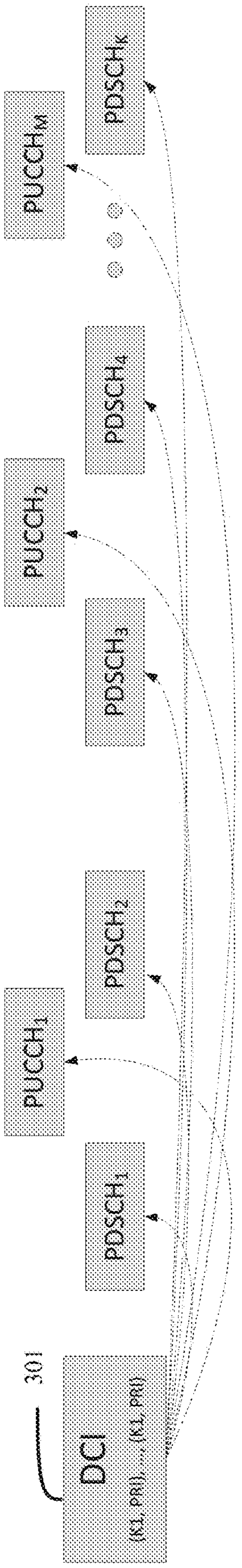
FIG. 3 illustrates an example of a DL grant, according to an embodiment.

FIG. 3 illustrates an example of a DL grant, according to an embodiment.

Referring to FIG. 3, a UE is indicated a set of M PUCCHs by indicating M values for K1 and a PRI for each of the PUCCHs. The indication of these values can be via a scheduling DCI 301. That is, the DCI 301 includes enough fields (i.e., M) to indicate those values, instead of a single value for K1 and PRI for one PUCCH as in a legacy system.

Increasing the number of fields for PRIs and K1s as illustrated in FIG. 3, also increases the DCI payload. Therefore, in accordance with an embodiment of the disclosure, a single value may still be used for K1 and PRI as in a legacy system, but the indicated value may interpreted using a table to provide multiple PUCCH occasions.

Figure 4:
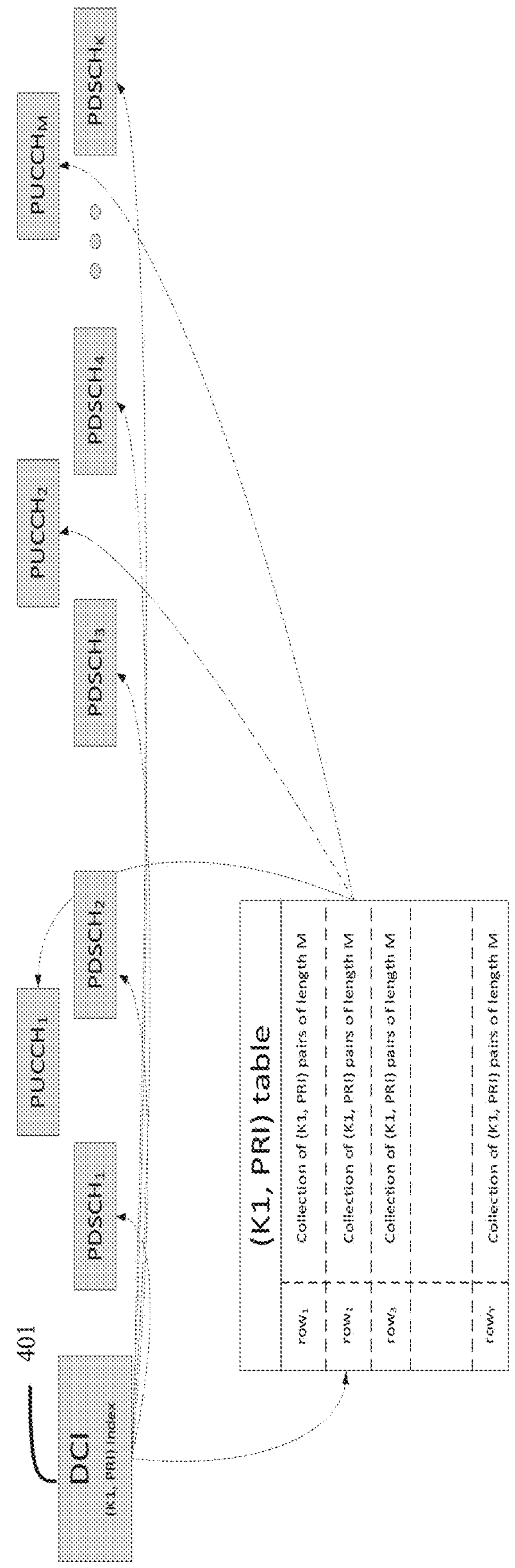
FIG. 4 illustrates an example of a DL grant, according to an embodiment.

FIG. 4 illustrates an example of a DL grant, according to an embodiment.

Referring to FIG. 4, to limit an increase in DCI size, an indication in DCI 401 may be in the form of an index to a table of possible combinations of M values for K1. A bit size of a field carrying the index in the DCI 401 should be large enough to represent all possible entries of the table. For example, a relationship of a bit size of the field and a total number of entries for the table is shown in Equation (1).

$$2^t \leq T \tag{1}$$

In Equation (1), t represent the bit size of the field and T represents the total number of entries for the table. For example, the entries for the table may be configured by higher layer signaling, e.g., RRC.

In accordance with an embodiment of the disclosure, a single reference PDSCH may be defined, e.g., a first PDSCH, from which different values of K1 are measured.

As described above, in legacy NR, K1 is interpreted relative to the last scheduled PDSCH. However, with the introduction of multiple PUCCH occasions, different reference PDSCH(s) may be provided.

Figure 5:
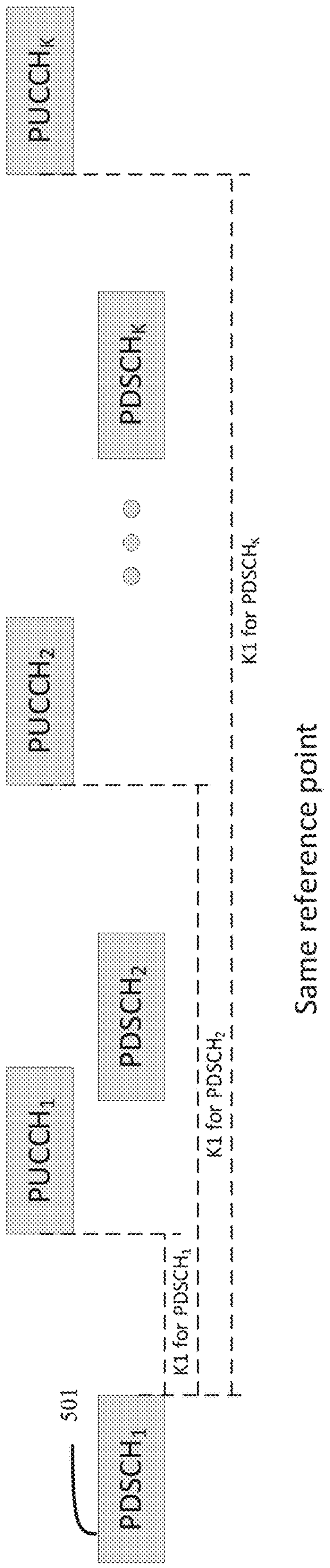
FIG. 5 illustrates an operation of transmitting multiple PUCCHs based on a single reference PDSCH, according to an embodiment.

FIG. 5 illustrates an operation of transmitting multiple PUCCHs based on a single reference PDSCH, according to an embodiment.

Referring to FIG. 5, all indicated values of K1 are measured with respect to the same reference PDSCH 501. Although FIG. 5 illustrates the first PDSCH being used as the reference PDSCH 501, the disclosure is not limited thereto. For example, the reference PDSCH 501 may be one of the other PDSCHs.

Figure 6:
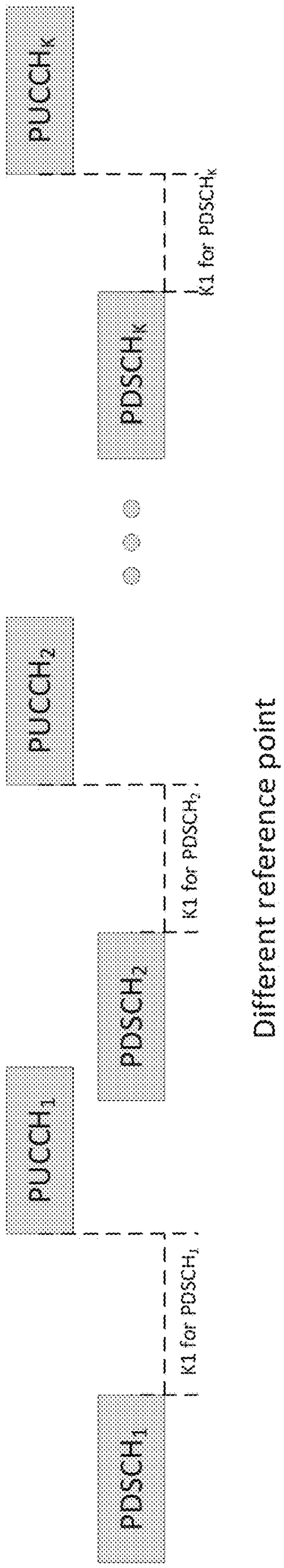
FIG. 6 illustrates an operation of transmitting multiple PUCCHs, according to an embodiment.

FIG. 6 illustrates an operation of transmitting multiple PUCCHs, according to an embodiment.

Referring to FIG. 6, when the number of PUCCH occasions is equal to the number of the scheduled PDSCHs, i.e., if M=K, then each K1 can be measured with respect to its corresponding PDSCH. That is, one-to-one mapping can be used to determine a time domain location of a PUCCH occasion.

As another alternative, a UE can be indicated one K1 value from which the UE determines M PUCCH occasions, where M is not necessarily equal to 1. For example, a UE determines M=K PUCCH occasions, where an ith PUCCH occasion is determined via the indicated K1 and measured with respect to an ith PDSCH.

Another alternative is that a UE can be indicated one K1 value for a first PUCCH occasion, and thereafter, the UE derives K1 of remaining PUCCH occasions according to predetermined rules. For example, the UE can determine the K1 of the remaining PUCCH occasions by applying a different offset $t_i$ to the indicated K1 value, i.e., the ith PUCCH occasion has a corresponding value of K1 equal to the indicated K1 value plus the offset $t_i$.

A gNB can indicate, to the UE, a set of offsets $t_i$ via RRC, MAC-CE, or DCI. Alternatively, the gNB can indicate the number of PUCCH occasions by RRC, MAC, or DCI, and the UE may determine the offset(s) by implicitly knowing the number of occasions, e.g., the ith PUCCH occasion has a corresponding K1 value equal to the indicated K1 value plus i−1 or $(i-1)*\lfloor K/M \rfloor$.

The determined K1 values can also be measured with respect to one reference PDSCH (e.g., a first PDSCH, a last PDSCH, or other PDSCH).

Figure 7:
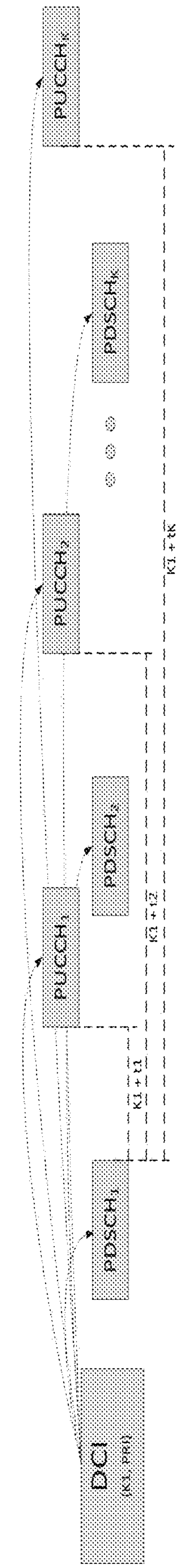
FIG. 7 illustrates an example of using offsets for K1 indication when a reference point is a first PDSCH, according to an embodiment.

FIG. 7 illustrates an example of using offsets for K1 indication, when a reference point is a first PDSCH, according to an embodiment.

Referring to FIG. 7, if M=K, then each K1 can be measured with respect to its corresponding PDSCH.

Figure 8A:
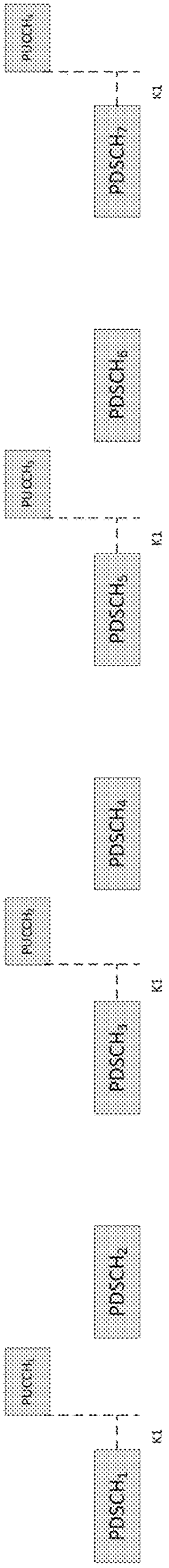
FIGS. 8A and 8B illustrate examples of using offsets for K1 indication, when M<K, according to an embodiment.
Figure 8B:
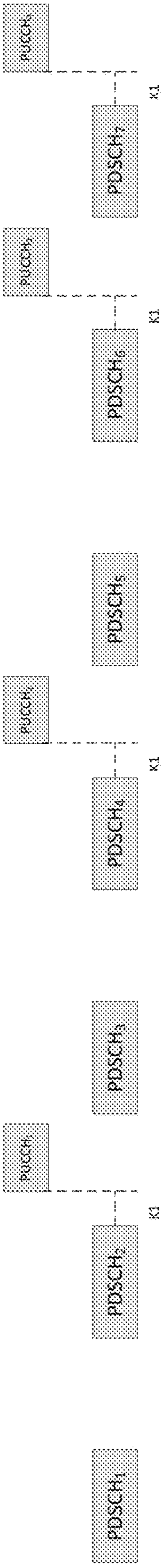

FIGS. 8A and 8B illustrate examples of using offsets for K1 indication, when M<K, according to an embodiment.

Referring to FIGS. 8A and 8B, if M<K, then each K1 can be measured with respect to a particular PDSCH in the set of PDSCHs. For example, the UE determines an ith PUCCH occasion (i=1, . . . , M−1), where i represents a PUCCH index, by measuring K1 from $$(i-1)\left\lfloor \frac{K}{M} \right\rfloor + V_1$$

and determines an Mth PUCCH occasion by measuring K1 from $$(M-1)\left\lfloor \frac{K}{M} \right\rfloor + V_2.$$

As illustrated in FIG. 8A, for K=7 and M=4, $V_1$ and $V_2$ can both be equal to 1.

As illustrated in FIG. 8B, for K=7 and M=4, $V_1$ can be equal to $$\left\lfloor \frac{K}{M} \right\rfloor$$

and $V_2$ can be equal to $$K-(M-1)\left\lfloor \frac{K}{M} \right\rfloor.$$

Also, the number of PUCCH occasions or the corresponding offset for determining K1 may depend on the number of scheduled PDSCHs. Table 1 provides an example of offset values to be applied to an indicated K1, based on a number of scheduled PDSCHs. For example, a table of predefined values like Table 1 may be provided in a specification.

TABLE 1

| # of scheduled PDSCHs (K) | Offset values to be applied to indicated K1 |
|---|---|
| K < 4 | 0 |
| 4 ≤ K < 8 | 3, 6 |
| 8 ≤ K <4 | 3, 6, 9 |
| . . . | . . . |

In accordance with an embodiment of the disclosure, a UE can also be provided with PRI information for determining PUCCH resources in a manner that is similar to the mechanisms used for indicating K1 values associated with the M PUCCH occasions. That is, most of the aforementioned techniques for indicating K1 values can also be extended to indicate PRI values.

Mapping K PDSCHs to M PUCCH Occasions

The mapping of PDSCHs to PUCCH occasions (i.e., determining which PUCCH is to be used to transmit HARQ feedback for each PDSCH) should be specified. In accordance with an embodiment of the disclosure, the following example rules can be applied.

1. In case M=K, then a PDSCH number i can be mapped to a PUCCH occasion number i.
2. A PDSCH can be mapped to a closest PUCCH occasion that occurs after the PDSCH reception.

Figure 9:
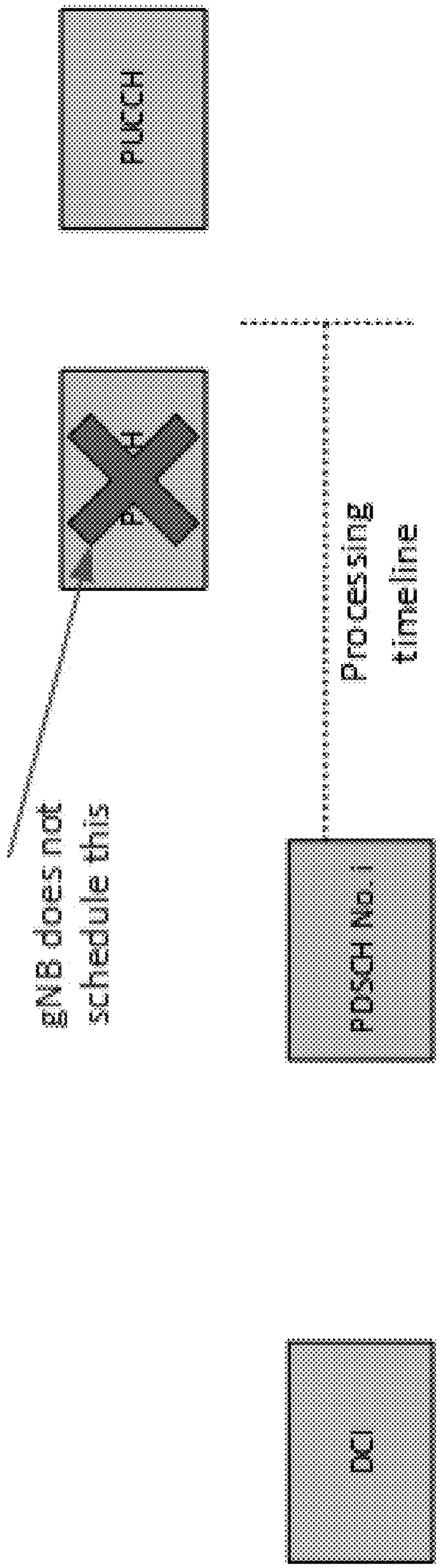
FIG. 9 illustrates an example of mapping a PDSCH to a closest PUCCH occasion that occurs after the PDSCH reception, according to an embodiment.

FIG. 9 illustrates an example of mapping a PDSCH to a closest PUCCH occasion that occurs after the PDSCH reception, according to an embodiment.

Referring to FIG. 9, a gNB should ensure that such a PUCCH occasion is sufficiently later than the PDSCH, i.e., there is enough timeline between the PDSCH and corresponding PUCCH to allow for UE processing time. Accordingly, the gNB does not schedule a PUCCH until after the UE has had enough time to process the received PDSCH.

3. A PDSCH can be mapped to a closest PUCCH occasion that occurs after a PDSCH reception+UE processing time.

Figure 10:
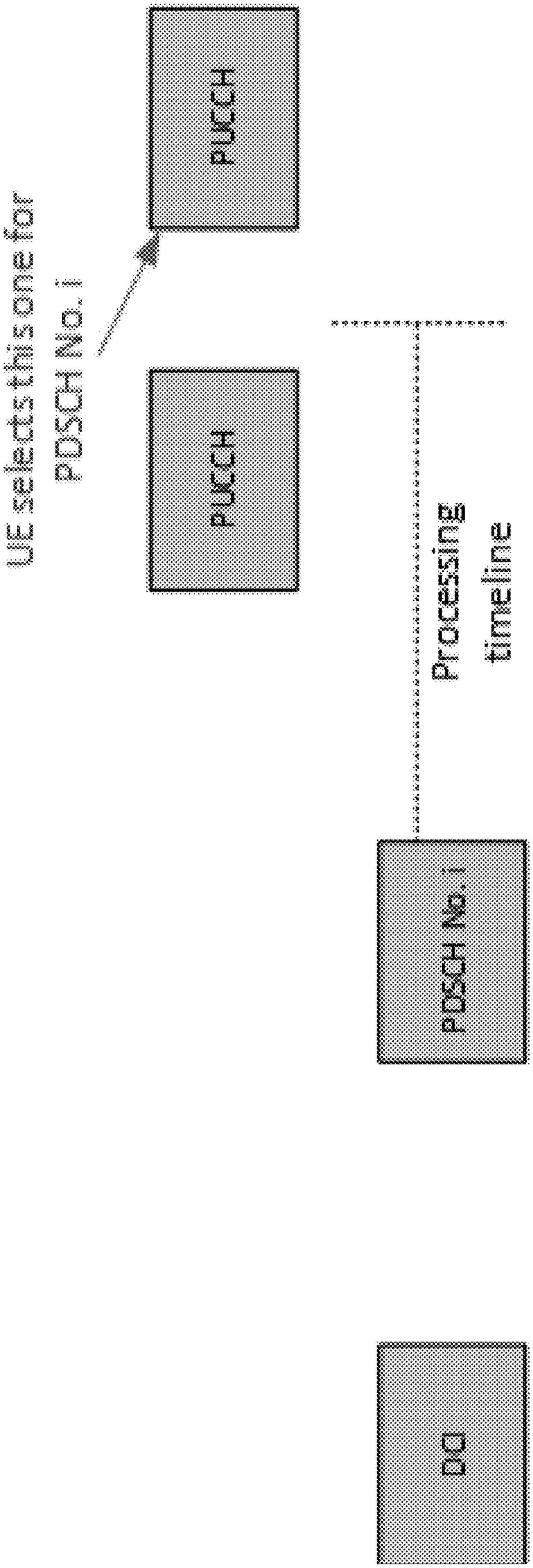
FIG. 10 illustrates an example of mapping a PDSCH to a closest PUCCH occasion that occurs after the PDSCH reception plus UE processing time, according to an embodiment.

FIG. 10 illustrates an example of mapping a PDSCH to a closest PUCCH occasion that occurs after the PDSCH reception plus UE processing time, according to an embodiment.

Referring to FIG. 10 a UE selects a PUCCH occasion that satisfies its required UE processing time requirement. That is, a difference between FIGS. 9 and 10 is that in FIG. 10, the UE selects the occasion that satisfies its required UE processing time requirement, regardless of whether the gNB schedules a PUCCH that occurs before the UE has had enough time to process the received PDSCH.

More specifically, in the embodiment depicted in FIG. 9, the gNB shall not schedule PUCCH that does not satisfy the required UE processing time requirement. However, in the embodiment illustrated in FIG. 10, the gNB can schedule PUCCH that does not satisfy the required UE processing time requirement, but the UE does not use it and select the next PUCCH that satisfies the processing time requirement.

4. A group of PDSCHs scheduled in consecutive slots are mapped to a first PUCCH occurring after an end of a last PDSCH in the group of PDSCHs. Different groups of PDSCHs can be scheduled to different PUCCH occasions.
5. A maximum can be established based on a size of such groups of PDSCHs, i.e., the group consists of a maximum number of PDSCHs in consecutive slots, or $M^{max}$ PDSCHs in consecutive slots, whichever is smaller.

Different Interpretation of Values of K1

In accordance with an embodiment of the disclosure, a UE may interpret values of K1 in different manner that in a legacy system.

Figure 11:
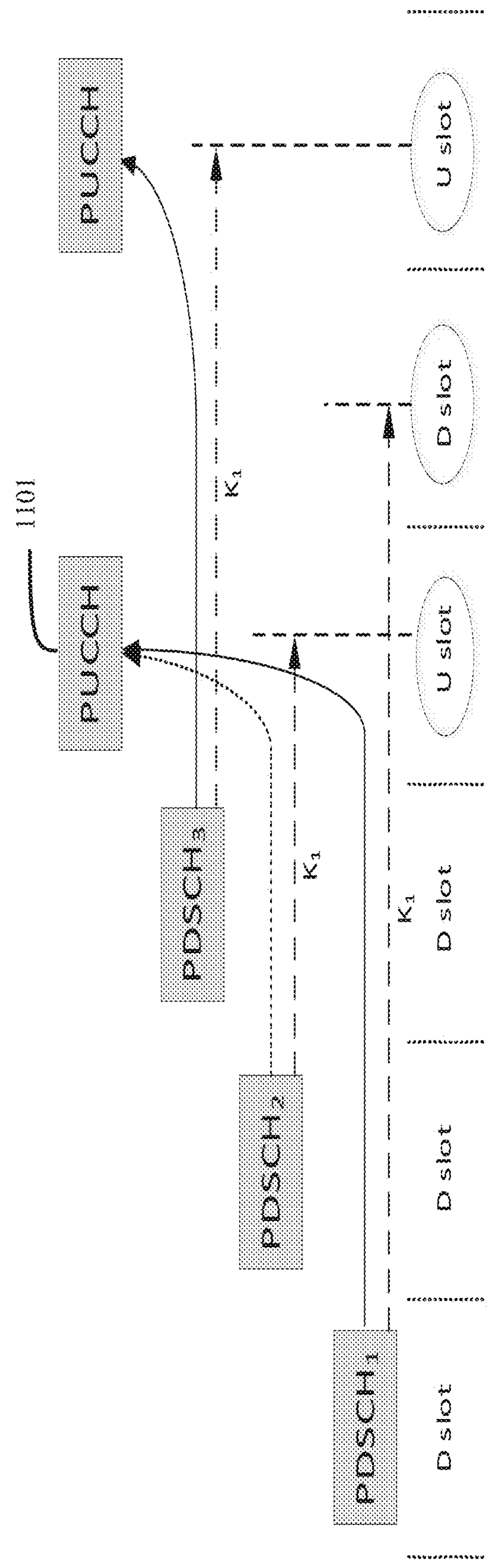
FIG. 11 illustrates an example in which a PUCCH occasion corresponds to an ith PDSCH scheduled at a latest uplink slot before or at a slot indicated by an ith K1 and measured from the ith PDSCH, according to an embodiment.

FIG. 11 illustrates an example in which a PUCCH occasion corresponds to an ith PDSCH scheduled at a latest uplink slot before or at a slot indicated by an ith K1 and measured from the ith PDSCH, according to an embodiment.

Referring to FIG. 11, when a UE is indicated with or configured to determine K different values of K1 (i.e., same as the number of PDSCHs), the UE interprets these values as maximum values, and then a PUCCH occasion corresponding to the ith PDSCH is scheduled at a latest uplink slot before or at the slot indicated by the ith K1 and measured from the ith PDSCH. This approach may result in PUCCH occasions of more than one PDSCH overlapping in the same UL slot.

When a UE is indicated one value of K1, the UE may interpret K1 as a maximum value, and then determine a PUCCH for an ith PDSCH as one in a latest UL slot before or at a slot indicated by the K1 and measured from the ith PDSCH.

As illustrated in FIG. 11, to further reduce the latency of the HARQ feedback, the UE may attempt to transmit the HARQ feedback in an earlier PUCCH occasion 1101 that satisfies the processing timeline. This approach may result in PUCCH occasions of more than one PDSCH overlapping in the same UL slot. It is noted that this approach is similar to FIG. 11 with all PDSCHs having the same maximum value.

When a UE is indicated M values of K1 (where M is not necessarily equal to K), a group of PDSCHs may be divided into K−1 consecutive sets, each consisting of $$\left\lfloor \frac{K}{M} \right\rfloor$$

consecutive PDSCHs and a last set consisting of $$K-(K-1)\left\lfloor \frac{K}{M} \right\rfloor.$$

Here, "consecutive PDSCHs" refers to the PDSCH ordering in the set of scheduled PDSCHs, not necessarily the fact that they are allocated in consecutive slots.

Thereafter, an ith set would have a maximum value equal to a corresponding K1 value, and a PUCCH occasion corresponding to that set of PDSCHs is a latest UL slot that is before or at a slot indicated by the corresponding K1 value measured from an end of a last PDSCH in the set of PDSCHs.

When a UE is indicated M values of K1 (where M is not necessarily equal to K), then a group of PDSCHs may be divided into M consecutive sets of consecutive PDSCHs. A first Q sets of PDSCHs are all of size $$P_1 = \left\lceil \frac{K}{M} \right\rceil$$

while the remaining M−Q sets of PDSCHs are all of size $$P_2 = \left\lfloor \frac{K}{M} \right\rfloor.$$

Here, Q=mod(K, M).

It is noted that the indicated values may also be provided to a UE in different ways, e.g., via RRC configuration or being pre-specified. In this case, no dynamic indication is needed for determining PUCCH occasions.

HARQ-ACK Aspects

Type-2 CB and DL Assignment Index (DAI) Aspects

Once a common understanding is established between a UE and a gNB for determining PUCCH slots for each scheduled PDSCH, e.g., according to the above-described methods, the UE may apply a separate DAI and PRI to each of the determined PUCCH slots. Separate DAI or PRI may be indicated separately via different fields in the DCI, via joint indication of codepoint, or by applying a single value to all PUCCH slots. With the last method a single DAI and/or PRI field is applied for each PUCCH slot. That is, the UE assumes that the gNB has indicated the same value for all the PUCCH slots.

In the following methods, wherein $M \leq M_{max}$ is the number of determined PUCCH slots, it is assumed that with reference to one PUCCH slot (and the corresponding group of scheduled PDSCHs), a single entry for DAI value is applied.

In case of M>1 PUCCH slots corresponding to M groups of scheduled PDSCHs, a UE may separately apply indicated DAI values to each group for separate HARQ-ACK CB construction. In this case, $M_{max}$ is a maximum number of PDSCHs that can be in the same group.

Method 1—DAI Incremented by the Number of Scheduled PDSCHs, ACK/NACK (A/N) Bits Reserved According to DAI Values In type-2 HARQ-ACK CB, if a scheduling PDCCH schedules $M \leq M_{max}$ PDSCHs, the value of counter (C)-DAI in the DCI is incremented by M from the value of C-DAI on previous MO and previous cell. The UE reserves M A/N bits in case it detects such DCI.

Method 2—DAI Incremented by 1, A/N Bits Reserved According to $M_{max}$

In type-2 HARQ-ACK CB, if a scheduling PDCCH schedules $M \leq M_{max}$ PDSCHs, the value of C-DAI in the DCI is incremented by 1 from the value of C-DAI on previous MO and previous cell. The UE reserves $M_{max}$ A/N bits, regardless of whether it detects the DCI or not.

Type-1 CB

With Type-1 CB and when a UE is provided with a time division duplex (TDD) UL/DL configuration, the UE may remove some rows of a time domain resource allocation (TDRA) table if they overlap with a UL symbol. For example, with slot-based PDSCH repetition, at a given DL slot, a row r may be removed if it is invalid for a last $$N_{PDSCH}^{repeat,max}$$

slots. Similar row pruning may be performed with multi-slot PDSCH scheduling when A/N bits of the multi-slot PDSCHs are bundled together.

With a single PUCCH assignment, $$N_{PDSCH}^{repeat,max}$$

is a maximum number of possible scheduled PDSCHs. With PDSCH grouping and multiple PUCCH slots, HARQ-ACK bundling should be performed for each group of PDSCHs and based on the maximum number of possible scheduled PDSCHs in each group.

Figure 12:
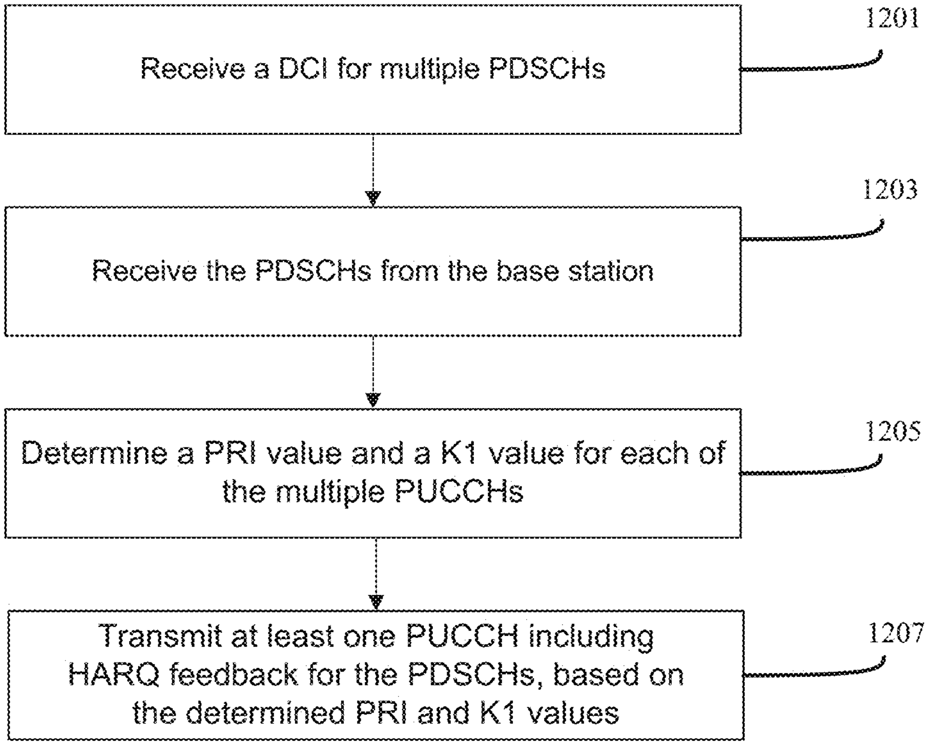
FIG. 12 is a flowchart illustrating a method performed by a terminal in a wireless communication system, according to embodiment.

FIG. 12 is a flowchart illustrating a method performed by a terminal in a wireless communication system, according to embodiment.

Referring to FIG. 12, in step 1201, a terminal, e.g., a UE, receives, from a base station, e.g., a gNB, a DCI for multiple PDSCHs. As described above, the DCI includes an indication of at least one PRI and at least one K1 for providing multiple PUCCHs to carry HARQ feedback for the PDSCHs.

In step 1203, the terminal receives the PDSCHs from the base station, and in step 1205, the terminal determines a PRI value and a K1 value for each of the multiple PUCCHs, based on the indication of the at least one PRI and the at least one K1. For example, as illustrated in FIG. 3, a terminal is indicated a set of M PUCCHs by indicating M values for K1 and a PRI for each of the PUCCHs.

In step 1207, the terminal transmits, to the base station, at least one PUCCH among the multiple PUCCHs including the HARQ feedback for the PDSCHs, based on the determined PRI and K1 values. The transmission of the PUCCHs based on the PRIs and the at least one K1 may be performed in accordance with any of the above-described embodiments of the disclosure, e.g., FIG. 3 or 4.

Figure 13:
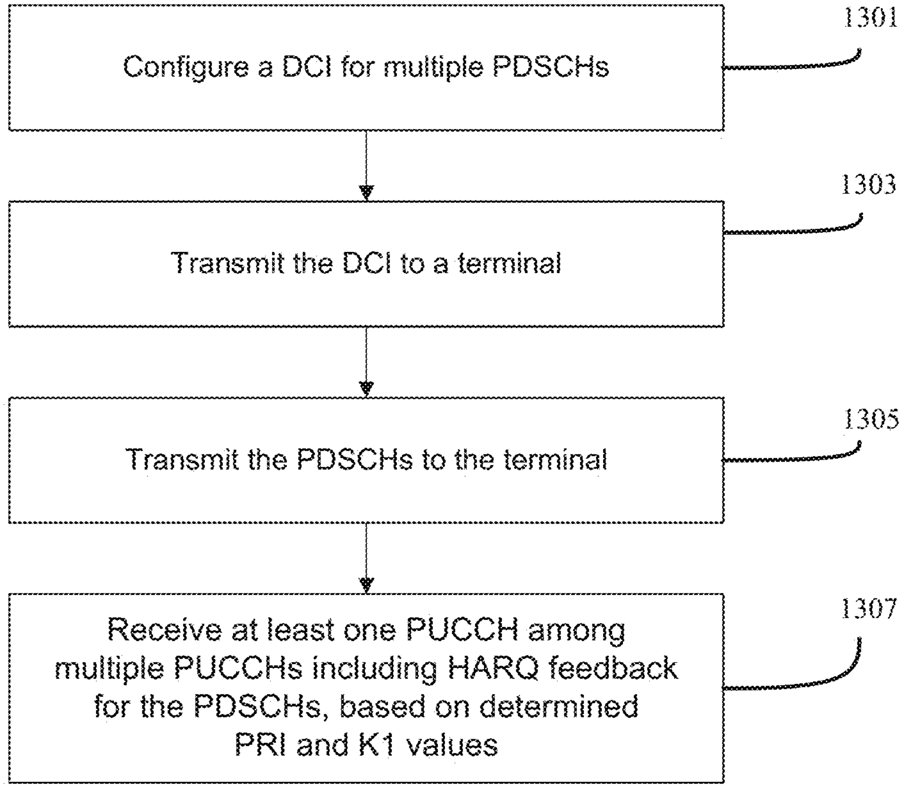
FIG. 13 is a flowchart illustrating a method performed by a base station in a wireless communication system, according to embodiment.

FIG. 13 is a flowchart illustrating a method performed by a base station in a wireless communication system, according to embodiment.

Referring to FIG. 13, in step 1301, the base station, e.g., a gNB, configures a DCI for multiple PDSCHs. As described above, the DCI includes an indication of at least one PRI and at least one K1 for providing multiple PUCCHs to carry HARQ feedback for the PDSCHs.

In steps 1303, the base station transmits the DCI to a terminal, e.g., a UE.

In step 1305, the base station transmits the PDSCHs to the terminal.

In step 1307, the base station receives, from the terminal, at least one PUCCH among the multiple PUCCHs including the HARQ feedback for the PDSCHs, based on determined PRI and K1 values. As described above, the terminal determines a PRI value and a K1 value for each of the multiple PUCCHs, based on the indication of the at least one PRI and the at least one K1, e.g., in accordance with the embodiment of FIG. 3 or 4.

Figure 14:
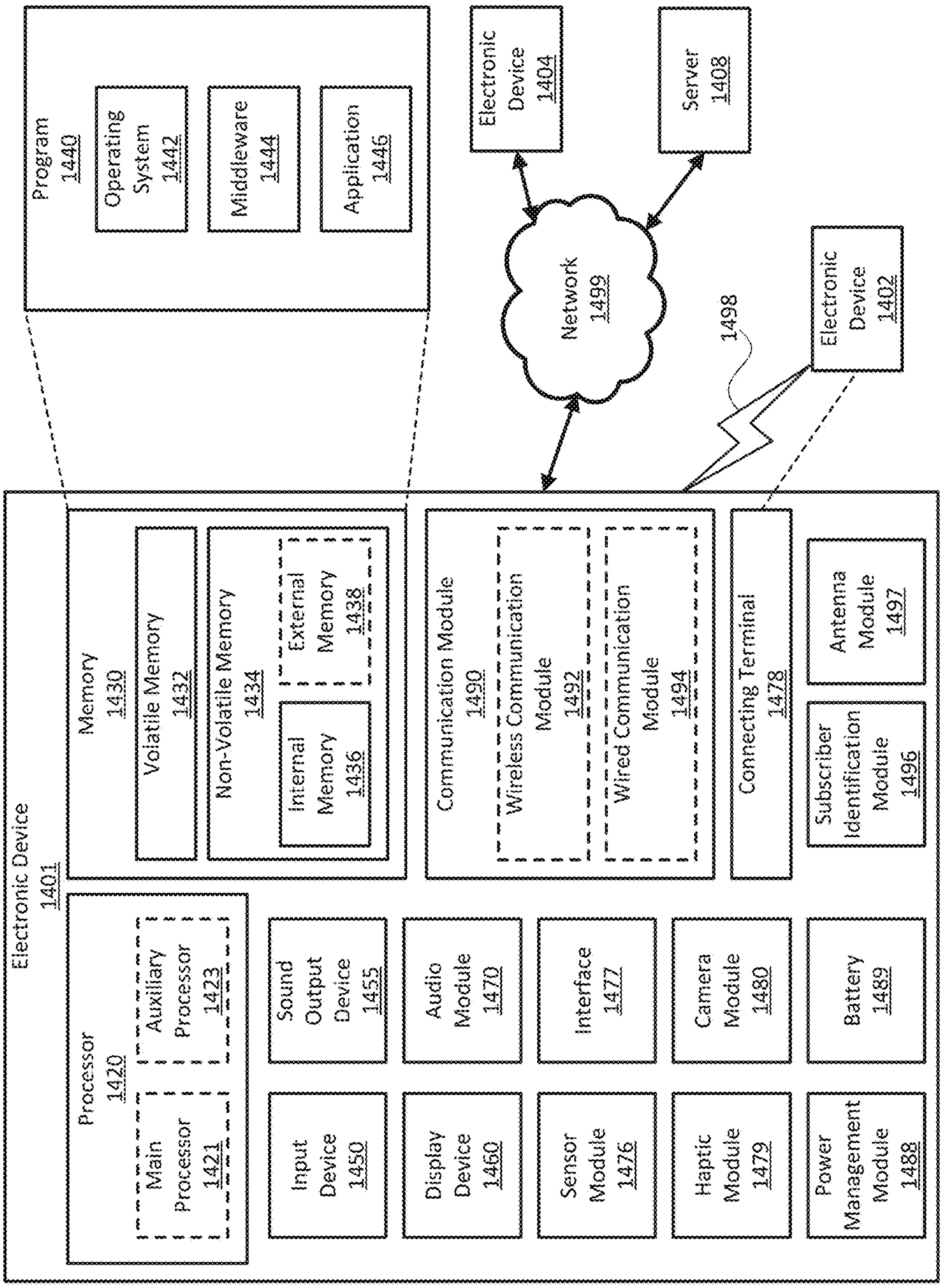
FIG. 14 is a block diagram of an electronic device in a network environment, according to an embodiment.

FIG. 14 is a block diagram of an electronic device in a network environment 1400, according to an embodiment.

Referring to FIG. 14, an electronic device 1401, e.g., a UE as described above with reference to FIGS. 4-13, in a network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) card 1496, or an antenna module 1497. In one embodiment, at least one (e.g., the display device 1460 or the camera module 1480) of the components may be omitted from the electronic device 1401, or one or more other components may be added to the electronic device 1401. Some of the components may be implemented as a single integrated circuit (IC). For example, the sensor module 1476 (e.g., a fingerprint sensor, an iris sensor, or an illuminance sensor) may be embedded in the display device 1460 (e.g., a display).

The processor 1420 may execute software (e.g., a program 1440) to control at least one other component (e.g., a hardware or a software component) of the electronic device 1401 coupled with the processor 1420 and may perform various data processing or computations.

As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). The auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434. Non-volatile memory 1434 may include internal memory 1436 and/or external memory 1438.

The program 1440 may be stored in the memory 1430 as software, and may include, for example, an operating system (OS) 1442, middleware 1444, or an application 1446.

The input device 1450 may receive a command or data to be used by another component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. The display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. The audio module 1470 may obtain the sound via the input device 1450 or output the sound via the sound output device 1455 or a headphone of an external electronic device 1402 directly (e.g., wired) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wired) or wirelessly. The interface 1477 may include, for example, a high-definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. The connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. The haptic module 1479 may include, for example, a motor, a piezoelectric element, or an electrical stimulator.

The camera module 1480 may capture a still image or moving images. The camera module 1480 may include one or more lenses, image sensors, image signal processors, or flashes. The power management module 1488 may manage power supplied to the electronic device 1401. The power management module 1488 may be implemented as at least part of, for example, a power management integrated circuit (PMIC).

The battery 1489 may supply power to at least one component of the electronic device 1401. The battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the AP) and supports a direct (e.g., wired) communication or a wireless communication. The communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as BLUETOOTH™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. The antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

Commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

Figure 15:
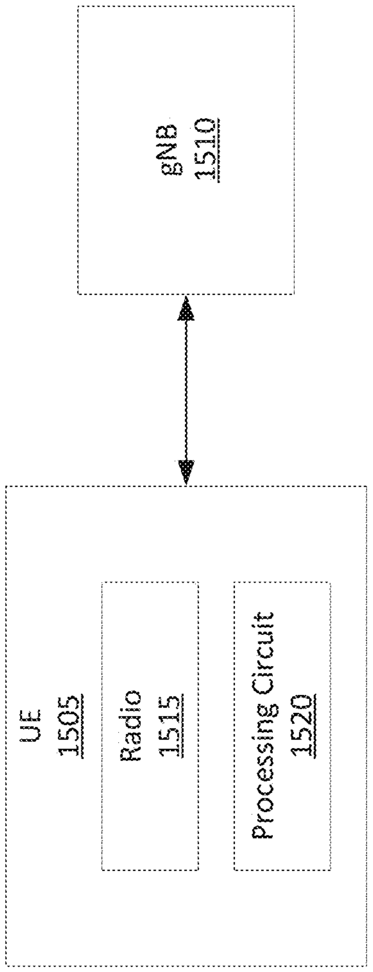
FIG. 15 illustrates a system including a UE and a gNB in communication with each other, according to an embodiment.

FIG. 15 shows a system including a UE 1505 and a gNB 1510, in communication with each other. The UE may include a radio 1515, e.g., a transceiver, and a processing circuit (or a means for processing) 1520, which may perform various methods disclosed herein, e.g., the method illustrated in FIG. 12. For example, the processing circuit 1520 may receive, via the radio 1515, transmissions from the network node (gNB) 1510, and the processing circuit 1520 may transmit, via the radio 1515, signals to the gNB 1510.

Although not illustrated in FIG. 15, the gNB 1510 may also include a radio, e.g., a transceiver, and a processing circuit for performing reciprocal operations with the UE 1505.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

In accordance with the above-described embodiments, a UE is able to transmit HARQ earlier than in an existing scheme, which may help the UE to meet the more stringent latency requirements of XR. Also, a UE is provided with multiple PUCCH occasions associated with a single or a group of PDSCH. In addition, a UE is able to determine how to associate different PDSCHs with PUCCH. Further, HARQ codebook construction may be enhanced to reduce reporting overhead.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by a terminal in a wireless communication system, the method comprising:

receiving, from a base station, a downlink (DL) control information (DCI) for multiple physical DL shared channel (PDSCHs), the DCI including an indication of at least one physical uplink (UL) control channel (PUCCH) resource indicator (PRI) and at least one timing indicator (K1) for providing multiple PUCCHs to carry hybrid automatic repeat request (HARQ) feedback for the PDSCHs;

receiving the PDSCHs from the base station;

determining a PRI value and a K1 value for each of the multiple PUCCHs, based on the indication of the at least one PRI and the at least one K1; and transmitting, to the base station, at least one PUCCH among the multiple PUCCHs including the HARQ feedback for the PDSCHs, based on the determined PRI and K1 values, wherein transmitting, to the base station, the at least one PUCCH among the multiple PUCCHs including the HARQ feedback, for the PDSCHs, comprises transmitting HARQ feedback for a PDSCH mapped to a later scheduled PUCCH transmission, in an earlier PUCCH transmission satisfying a processing timeline of the terminal.

2. The method of claim 1, wherein the indication of the at least one PRI and the at least one K1 includes a plurality of fields indicating the PRI values and the K1 values.

3. The method of claim 1, wherein the indication of the at least one PRI and the at least one K1 includes a single field including an index to an entry of a table identifying the PRI values and the K1 values.

4. The method of claim 3, wherein a bit size of the single field is based on a total number of entries in the table.

5. The method of claim 4, wherein the table is configured by higher layer signaling.

6. The method of claim 3, wherein the table includes a plurality of entries, and each of the of entries indicates different numbers of the PRI values and the K1 values.

7. The method of claim 1, wherein each of the PDSCHs is one-to-one mapped to one of the multiple PUCCHs, and wherein a respective K1 value for each of the multiple PUCCHs is measured relative to a corresponding mapped PDSCH.

8. The method of claim 1, wherein the indication of the at least one K1 includes multiple K1 values for the multiple PUCCHs, and wherein each of the K1 values for the multiple PUCCHs is measured relative to a reference PDSCH among the PDSCHs.

9. The method of claim 8, the reference PDSCH is a first PDSCH.

10. The method of claim 1, wherein the indication of the at least one K1 includes only one K1 value for a first PUCCH among the multiple PUCCHs, and wherein subsequent K1 values are determined for remaining PUCCHs among the multiple PUCCHs by applying a different offset to the one K1 value for each of the remaining PUCCHs.

11. The method of claim 10, further comprising receiving the different offsets via radio resource control (RRC), a medium access control (MAC)-control element (CE), or the DCI.

12. The method of 10, further comprising determining the different offsets based on PUCCHs indexes of the multiple PUCCHs.

13. The method of 10, further comprising determining the different offsets from a table based on a total number of the PDSCHs.

14. The method of 10, further comprising determining the different offsets based on a total number of the multiple PUCCHs and a total number of the PDSCHs.

15. The method of claim 1, further comprising mapping a PDSCH received to a closest PUCCH occasion that occurs after receiving the PDSCH reception and satisfying a processing timeline of the terminal that occurs after an indicated PUCCH, when the indicated PUCCH does not satisfy the processing timeline of the terminal.

16. The method claim 1, further comprising:

receiving, from the base station, another DCI; and incrementing a counter DL assignment index (C-DAI) by a value of 1 or by a value corresponding to a total number of the PDSCHs.

17. A method performed by a base station in a wireless communication system, the method comprising:

configuring a downlink (DL) control information (DCI) for multiple physical DL shared channel (PDSCHs), the DCI including an indication of at least one physical uplink (UL) control channel (PUCCH) resource indicator (PRI) and at least one timing indicator (K1) for providing multiple PUCCHs to carry hybrid automatic repeat request (HARQ) feedback for the PDSCHs;

transmitting the DCI to a terminal;

transmitting the PDSCHs to the terminal; and receiving, from the terminal, at least one PUCCH among the multiple PUCCHs including the HARQ feedback for the PDSCHs, based on determined PRI and K1 values, wherein the terminal determines a PRI value and a K1 value for each of the multiple PUCCHs, based on the indication of the at least one PRI and the at least one K1, and wherein receiving, from the terminal, the at least one PUCCH among the multiple PUCCHs including the HARQ feedback for the PDSCHs, comprises receiving HARQ feedback for a PDSCH mapped to a latter scheduled PUCCH transmission, in an earlier PUCCH transmission satisfying a processing timeline of the terminal.

18. A terminal comprising:

a transceiver; and a processor configured to:

receive, from a base station, a downlink (DL) control information (DCI) for multiple physical DL shared channel (PDSCHs), the DCI including an indication of at least one physical uplink (UL) control channel (PUCCH) resource indicator (PRI) and at least one timing indicator (K1) for providing multiple PUCCHs to carry hybrid automatic repeat request (HARQ) feedback for the PDSCHs, receive the PDSCHs from the base station, determine a PRI value and a K1 value for each of the multiple PUCCHs, based on the indication of the at least one PRI and the at least one K1, and transmit, to the base station, at least one PUCCH among the multiple PUCCHs including the HARQ feedback for the PDSCHs, based on the determined PRI and K1 values, by transmitting HARQ feedback for a PDSCH mapped to a later scheduled PUCCH transmission, in an earlier PUCCH transmission satisfying a processing timeline of the terminal.

19. A base station comprising:

a transceiver; and a processor configured to:

configure a downlink (DL) control information (DCI) for multiple physical DL shared channel (PDSCHs), the DCI including an indication of at least one physical uplink (UL) control channel (PUCCH) resource indicator (PRI) and at least one timing indicator (K1) for providing multiple PUCCHs to carry hybrid automatic repeat request (HARQ) feedback for the PDSCHs, transmit the DCI to a terminal, transmit the PDSCHs to the terminal, and receive, from the terminal, at least one PUCCH among the multiple PUCCHs including the HARQ feedback for the PDSCHs, based on determined PRI and K1 values, by transmitting HARQ feedback for a PDSCH mapped to a later scheduled PUCCH transmission, in an earlier PUCCH transmission satisfying a processing timeline of the terminal, wherein the terminal determines a PRI value and a K1 value for each of the multiple PUCCHs, based on the indication of the at least one PRI and the at least one K1.

* * * * *